Feb. 4, 1969 — J. E. SIMON — 3,426,176
WELDMENT AND PROCESS FOR WELDING THIN SHEET METALS
Filed Jan. 19, 1967

INVENTOR.
Joseph E. Simon
BY
ATTORNEY

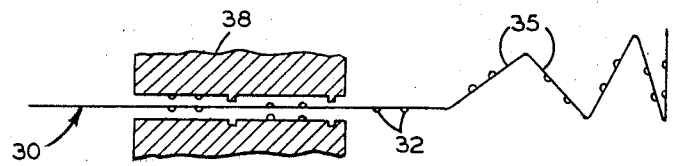
FIG. 4
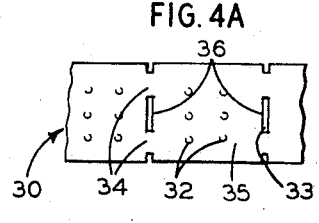
FIG. 4A
FIG. 5
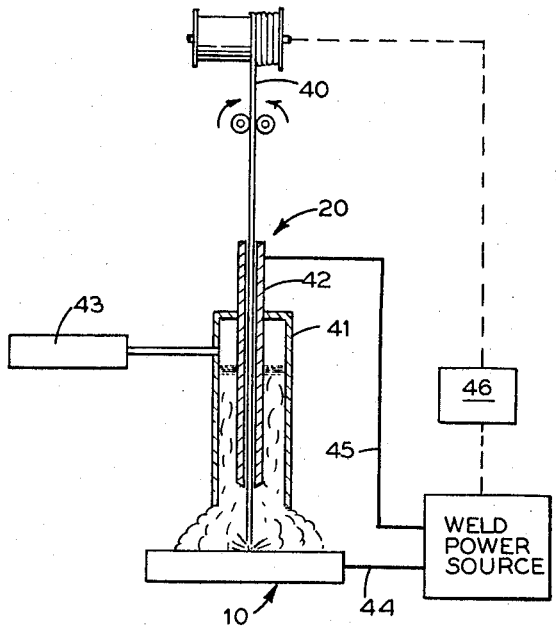

United States Patent Office 3,426,176
Patented Feb. 4, 1969

3,426,176
WELDMENT AND PROCESS FOR WELDING THIN SHEET METALS
Joseph E. Simon, Barberton, Ohio, assignor to The Babcock & Wilcox Company, New York, N.Y., a corporation of New Jersey
Filed Jan. 19, 1967, Ser. No. 610,393
U.S. Cl. 219—137                      10 Claims
Int. Cl. B23k 9/12

ABSTRACT OF THE DISCLOSURE

A process of welding a surface of a thin sheet metal strip to adjacently disposed end edges of a plurality of thin sheet metal plates formed from separated plates or from a continuous folded strip. A rigid weldment manufactured by gas-metal arc welding a surface of a thin sheet metal strip to the end edges of a plurality of thin sheet metal plates which are disposed substantially parallel with respect to each other so as to define a predetermined space therebetween. A rigidly constructed laminar flow heat transfer element and process of manufacturing the same.

BACKGROUND OF THE INVENTION

This invention relates generally to a process for welding thin sheet metal materials and to weldments thereby produced, and more particularly to a process for making rigidly constructed heat transfer elements utilizing a gas metal arc welding technique to produce a thin sheet metal weldment.

Heat transfer elements like the device described by Gram et al. in their application, Ser. No. 483,620, filed Aug. 30, 1965, may be produced by forming impressions in an elongated belt of thin sheet metal material, providing rectangular cutouts in the belt at intervals along the length thereof to define a series of plates integrally interconnected by hinges, folding each plate facewise toward its neighbor so as to form a stack of plates, and welding strips of metal upon opposing sides of the stack to hold each plate in rigid and substantially parallel relation with respect to its neighbor. The strips are commonly referred to as banding strips and have heretofore been welded to the stack using tungsten inert gas (TIG) welding techniques well known in the art.

In actual commercial practice, however, when using TIG welding, the inability to obtain welds of physically uniform quality and appearance; the need to automate the manufacturing process to produce a less expensive product; the need to prevent plate distortion due to expansion and contraction of the weld; the need to avoid arcing through the banding strip when welding at high amperages; and the inability to positively join the adjacent edges in a given cell to the banding strip, led the inventor to search for a better joining technique.

At this point it should be understood that some of the difficulties encountered are well known in the art. For example, it is known to deposit a weld upon the free ends of the teeth of a comb whose teeth comprise a plurality of parallel plates spaced a known distance apart from one another, and use strain gage techniques to measure the contraction and expansion of the weld metal deposited by measuring the distortion of the teeth of the comb. These teachings tend to show that depositing weld metal along a series of free ends of thin sheet metal plates disposed parallel with respect to each other will distort the plates. Such a result was observed when the TIG welding process was used to fabricate the heat transfer elements hereinbefore described. The effect is undesirable because the heat transfer efficiency of a given element decreases correspondingly with the distortion. Further, the problem is complicated by the fact that the plates of the element are at least an order of magnitude thinner than the sheet metal materials used in fabricating a typical comb and distortions are comparatively magnified.

SUMMARY OF THE INVENTION

Despite the known art and the applicant's prior experience he has discovered that a continuous gas-metal arc welding process is adaptable to the task of forming weldments comprised of thin sheet metal materials generally. Further, by using the continuous welding technique herein disclosed, a twofold increase in heat transfer element production rate has been achieved; element plate deformations have been remarkably reduced; welds of physically uniform quality and appearance are easily produced; arcing problems have been eliminated; and a rigid construction realized. The applicant believes that the process is universally applicable insofar as the area of connecting a thin sheet metal material to a plurality of thin sheet metal plates is concerned.

BRIEF DESCRIPTION OF THE DRAWING

FIG. 4 is a schematic view of a die arrangement for manufacturing the heat exchange elements;
FIG. 4A is a partial plan view of a belt;
and
FIG. 5 is a schematic view of the welding arrangement for manufacturing the heat exchange elements.

DESCRIPTION OF PREFERRED EMBODIMENTS

Figure 1:
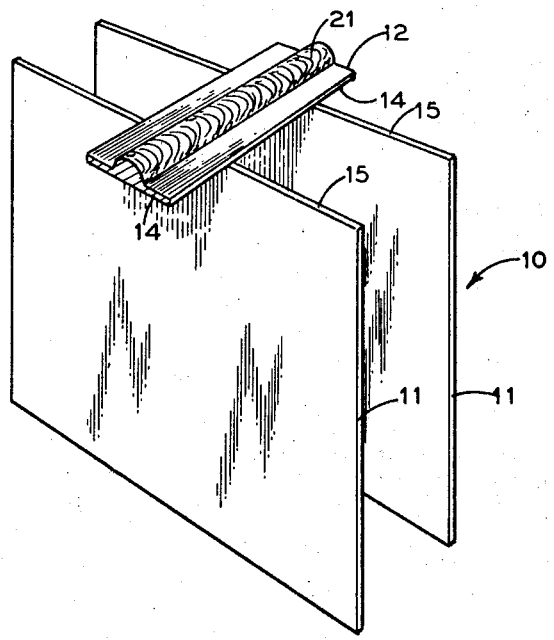
FIG. 1 is an isometric view of a typical weldment formable by means of the inventive technique.

Referring now to the drawing wherein like reference characters designate like or corresponding parts throughout the several views, there is shown in FIG. 1 a T-shaped weldment 10 comprising a plurality of thin sheet metal elements 11, 12 welded together by means of the inventive process. The weldment 10 is a rudimentary form of a more complex arrangement of thin sheet metal elements which will hereinafter be more fully described. The weldment of FIG. 1 may be considered to be generally representative of a type of thin sheet metal structure formable by means of the inventive process herein disclosed.

The weldment 10 is seen to include a plurality of opposing like-dimensioned thin sheet metal plates 11 oriented substantially parallel with respect to one another, and an elongated thin sheet metal strip 12 having a surface 14 thereof oriented substantially normal with respect to the plates. The plates 11 are edgewise abutted to a surface 14 of the strip 12 and held spaced apart in substantially parallel relation with respect to each other by means of a gas-metal arc weld bead 21 deposited substantially along the longitudinal centerline of the strip. A rigid joinder of the elements 11, 12 is realized by abutting a surface 14 of the strip 12 to adjacently positioned end edges 15 of the plates, such that each of the edges 15 lies along a line substantially parallel to the surface of the strip and preferably transverse to the longitudinal axis thereof; holding the elements 11, 12 abuttingly disposed and simultaneously advancing them together, such that the surface of the strip remote from the plates is continuously disposed at a predetermined distance from an operating gas-metal arc welding device 20 (FIG. 5) and in welding relation with respect thereto; and continuously depositing weld metal 21 along the longitudinal centerline of the strip during the advancement thereby separately joining each plate individually to the strip.

Figure 2:
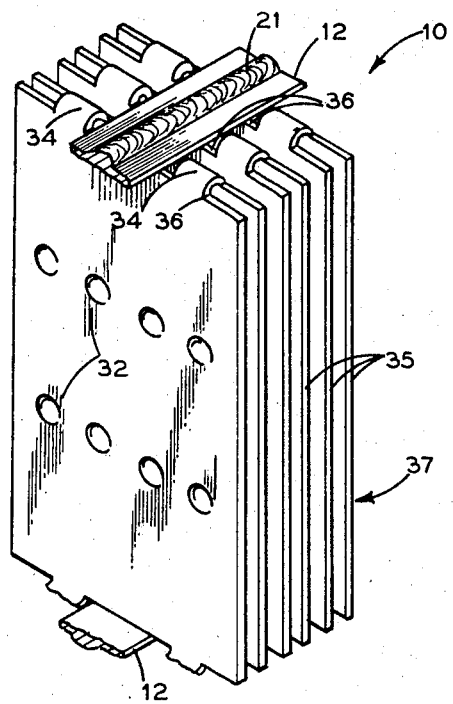
FIG. 2 is an isometric view of a heat exchange element constructed and arranged according to the invention.
Figure 3:
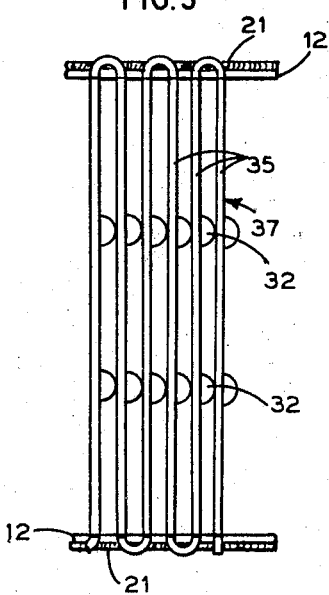
FIG. 3 is an elevation view of the heat exchange element shown in FIG. 2.

The preferred embodiment is a heat exchange element 10 shown in FIG. 2 which comprises a thin sheet metal belt 30 (FIGURE 4) of predetermined length folded upon itself in an accordion-like fashion and held together by a pair of oppositely disposed thin sheet metal banding strips 12 welded thereto. As shown in FIGS. 4 and 4A, the belt 30, in passing through the die 38, is prepared for folding by first forming a plurality of dimples 32 therein and providing cutouts 33 therethrough. The dimples 32 are raised impressions disposed in rows substantially transverse to the longitudinal length of the belt and act as stand-offs between successive plates to establish a plate spacing of from approximately 30 to 60 thousandths of an inch. The cutouts 33 are slotted openings disposed at discrete intervals throughout the length of the belt to define a series of pairs of bendable segments 34 which serve as hinges. The cutouts 33 are uniformly spaced apart along the longitudinal length of the belt 30. The preparatory step forms a group of substantially like-dimensioned plates 35 which are integrally interconnected by pairs of bendable hinge segments 34. It is seen that in forming the substantially rectangular cutouts 33, an end edge 36 is defined at each end of a given plate. Before the folding operation, the end edges of each plate are disposed substantially facewise parallel with respect to an end edge of an adjacent plate. The plates 35 are then succesively folded in alternate directions at the hinges to form a stack of plates 37. Each of the plates is preferably disposed parallel with respect to its neighbor in addition to being spaced apart therefrom. The belt 30 preferably comprises a thin sheet metal material with a thickness of from approximately 16 to 39 thousandths of an inch. The folding operation disposes the end edges intermediate a given pair of hinged elements 34 substantially in the same plane. Hence, the accordion folding step forms a pair of opposing element sides each of which is defined by a series of end edges and fold peaks disposed in separate planes. A thin sheet metal banding strip 12 is then lain facewise upon one of the series of end edges and welded thereto. The strip 12 perferably comprises a thin sheet metal material with a thickness of from approximately 16 to 39 thousandths of an inch. It should be noted that when the cutouts are formed, the width of a cutout as measured along the longitudinal axis of the unfolded belt 30 is preferably chosen such that when the strip is lain in place on the edges 36 of the stack 37, the surface of the strip remote from the end edges lies in a plane below the plane described by the series of fold peaks. Further, in the preferred embodiment the edge plane to fold peak plane depth is preferably chosen to similary accommodate the weld bead 21 as shown in FIG. 3.

Referring now to FIG. 5, there is shown a gas-metal arc welding device or automatic welding head assembly 20 which comprises a supply spool of welding wire 40 automatically feedable toward a workpiece such as the assembly shown in FIGS. 1 or 2; a gas manifold 41 having a collet 42 connected substantially axially thereof to guide welding wire 40 fed therethrough; a source of gas supply 43 adapted to the manifold 41 and adjusted to meter gas therethrough during the welding operation; and a weld power source, as indicated, isolated from line voltage fluctuations by means well known in the art and provided with ground 44 and power 45 lines typically adapted to the workpiece and collet respectively. A means 46 for automatically adjusting the rate of feed of welding wire 40 is adapted to the welding device 20. The automatic adjusting means 46 operates as a function of the variation in arc length and compensates for variations therein by causing a greater or lesser length of welding wire to be fed to the workpiece in a given interval of time. It should be understood that the tungsten inert gas (TIG) welding process heretofore employed by those skilled in the art is not adaptable to automated operation. Applicant considers his adaptation of an automatic adjusting means 46 to his process to be an added feature of his invention.

The TIG welding process heretofore employed required employing inert gas for shielding purposes. The TIG process required the use of 100% argon gas. The inventive process allows the use of a gas composed of approximately 75% argon and 25% carbon dioxide. Since the cost per unit volume of carbon dioxide is very much less than that of argon, it follows that workpieces may be less expensively welded by employing applicant's process. Further, when using the TIG process, an operator was able to weld strips at a maximum rate of ten inches per minute. The same operator using the method here disclosed can weld strips at the rate of 25 inches per minute by controlling a single automatically adjusted welding device 20, or 50 inches per minute by controlling two welding devices simultaneously.

In practice, a banding strip 12 is provided having a longitudinal length which is sufficient to overhang the end plates of a given stack by at least ¼ inch at each end. The extended length is provided so that the weld bead may be continuously and uniformly deposited along the longitudinal centerline of the strip without damaging the end plates. The welding arc progressively preheats each of the plates prior to the welding operation. Further, the last plate is overrun to prevent overheating thereof.

Prior to the welding operation, the stack of plates 37 are secured in a jig and a banding strip positioned in the slotted cutout 33. The jig and contents or workpiece are then placed in working relationship with the welding head 20. The workpiece is then movably disposed in welding relation with respect to an operating gas-metal arc welding device. A weld bead is laid along the longitudinal centerline of the strip commencing at a point at least ¼ inch from the end plate of the stack and remote therefrom. The workpiece is simultaneously advanced so that the weld bead is continuously deposited along the longitudinal centerline of the strip, terminating at least ¼ inch beyond the end plate of the stack remote from the point of welding commencement. The jig and contents are then turned 180° and an oppositely disposed banding strip is similarly welded to the to the plates 35 to complete the process. The manufacturing operation advantageously includes the subsequent step of cutting off the overhanging portions of the strip flush with the end plates.

It should be noted that the inventive process includes a technique for cotninuously blind welding the surface of a thin sheet metal strip to a hidden end edge of a thin sheet metal plate or a plurality thereof. For example, the plates which form the cell assembly of FIG. 2 are welded to what may be called the underside of the strip by means of laying a weld bead along the opposite or top side of the strip. Further, insofar as welding thin sheet metal materials are concerned, the most advantageous results are obtained by continuously feeding the consumable welding wire to the workpiece simultaneously with the application of heat thereto to achieve the desired jointure.

What is claimed is:

1. A gas-metal arc welded weldment comprising, a plurality of thin sheet metal plates having end edges, said plates, being disposed adjacent to one another and spaced apart, a thin sheet metal strip having one said thereof abutted to an end edge of each of said plates, and a gas-metal arc weld bead disposed on the opposite side of the strip substantially along the longitudinal axis thereof and continuously throughout the length thereof to weld said strip to said end edges.

2. The weldment according to claim 1 wherein said sheet metal plates comprise a plurality of discrete lengths of an accordian-like folded thin sheet material interconnected by hinges formed by cutouts defined therein, and the end edges are edges defined by the cutouts.

3. The weldment according to claim 1 wherein said thin sheet metal plates and said thin sheet metal strip are made of a ferrous material with a thickness dimension of from 16 to 39 thousandths of an inch.

4. The process of gas-metal arc welding a surface of a thin sheet metal strip element to adjacently disposed edges of a plurality of thin sheet metal plate elements which comprises:
 (a) arranging the plate elements adjacent to one another such that an edge of each plate is disposed adjacent the corresponding edge of the next adjacent plate;
 (b) abutting a surface of the strip element to the adjacently disposed plate edges; and
 (c) maintaining the elements so disposed while continuously depositing weld metal along the longitudinal centerline of the strip on the side thereof remote from said edges to separately join each plate individually to the strip.

5. The process according to claim 4 including the step of arranging the plate elements such that each of the abutting end edges lies along a line substantially transverse to the longitudinal axis of the strip.

6. The process according to claim 4 including the preliminary steps of cutting and arranging the plates from an elongated length of metal by cutting out portions of the elongated length to form a plurality of discrete lengths of plate interconnected by bendable hinges, and arranging the plates substantially parallel with respect to each other by alternately folding the plates at the hinges in an accordian-like manner thereby forming a stack of plates having end edges which are defined by the cutouts and are disposed in planes on opposite sides of the stack.

7. The process according to claim 6 including the step of forming the thin sheet metal strip of sufficient length to provide portions of the strip which overhang the ends of the stack when the strip is abutted thereto.

8. The process according to claim 7 including the step of commencing welding on one of the overhanging portions, continuously welding along the longitudinal axis of the strip and terminating welding on the other overhanging portion.

9. The process according to claim 8 including the step of cutting off the portions of the strip which overhang the stack after the welding is completed.

10. The process according to claim 9 including the step of automatically compensating for fluctuations in welding arc length during the welding step.

References Cited

UNITED STATES PATENTS 3,258,832  7/1966  Gerstung _____ 29—157.3

FOREIGN PATENTS 158,565  4/1922  Great Britain.

RICHARD M. WOOD, *Primary Examiner.*

J. G. SMITH, *Assistant Examiner.*

U.S. Cl. X.R.

29—157.3, 486; 165—166

UNITED STATES PATENT OFFICE
CERTIFICATE OF CORRECTION

Patent No. 3,426,176                                                                       February 4, 1969

Joseph E. Simon

It is certified that error appears in the above identified patent and that said Letters Patent are hereby corrected as shown below:

Column 3, line 27, "succesively" should read -- successively --; line 50, "similary" should read -- similarly --. Column 4, line 45, "cotninuously" should read -- continuously --; line 59, "plates," should read -- plates --; line 60, "said" should read -- side --.

Signed and sealed this 31st day of March 1970.

(SEAL)
Attest:

Edward M. Fletcher, Jr.                                         WILLIAM E. SCHUYLER, JR.

Attesting Officer                                                             Commissioner of Patents